US000001027H

United States Statutory Invention Registration [19]

[11] Reg. Number: H1027

Bottiger

[43] Published: Mar. 3, 1992

[54] AEROSOL MODULATING NOZZLE

[75] Inventor: Jerold R. Bottiger, Aberdeen, Md.

[73] Assignee: The United States of America as represented by the Secretary of the Army, Washington, D.C.

[21] Appl. No.: 722,538

[22] Filed: Jun. 25, 1991

[51] Int. Cl.[5] ..... B05B 1/08

[52] U.S. Cl. ..... 239/102.1; 73/28.04

*Primary Examiner*—Michael J. Carone

*Attorney, Agent, or Firm*—Anthony T. Lane; Edward Goldberg; Michael C. Sachs

[57] ABSTRACT

An aerosol modulating nozzle with a nozzle body having a nozzle head chamber and including aerosol sample flow inlet and outlets for transmitting aerosol sample through the nozzle head chamber. Also included is a sample discharge for discharging a small portion of aerosol in a predetermined direction along with a sheath of clean air. The quantity of sample discharged is modulated. Constrictions in the inlet and outlet flow tubes allow pressure fluctuations to be sustained in the nozzle head chamber. A loudspeaker operating into a closed chamber is used to generate pressure fluctuations which are transmitted to the nozzle head chamber.

10 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

AEROSOL MODULATING NOZZLE

The invention described herein may be made, used, or licensed by or for the Government for Governmental purposes without the payment to me of any royalties thereon or therefor.

FIELD OF THE INVENTION

This invention relates to an improved modulating nozzle for aerosol devices, and more particularly to a nozzle which is capable of use as one component of a complete integrated light scattering measurement apparatus.

BACKGROUND OF THE INVENTION

Observing the manner in which a beam of light interacts with an aerosol, with the degree of extinction of the incident beam and the angular distribution of the scattered light, can be a powerful technique for inferring properties of the aerosol particles, such as their shapes, sizes, and numbers. In the past 40 years, concurrent with the increasing power and availability of digital computers, it has become practical to carry out the extensive calculations which relate particle properties to light scattering properties, thus spuring the development of instruments for measuring light scattering.

A feature common to all such instruments is that the aerosol and light beam must be brought together. Numerous aerosol handling systems have been devised, varying in their operation according to the primary measurement goals of the instruments in which they are included.

Aerosol sampling systems for light scattering instruments may be conveniently differentiated according to the quantity of aerosol that is illuminated and examined. Devices intended to measure the extinction undergone by a light beam traversing an aerosol generally benefit from path lengths of several meters or more, so relatively large volume of aerosol must be illuminated, even hundreds of cubic centimeters. In these cases aerosol isn't sampled and delivered to the light beam so much as the instrument is delivered and set up at (or in) the location of the cloud. Examples include the Barnes model 14-70B transmissometer, and the Malvern Particle Sizer which examines the angular distribution of very nearly forward scattered light.

More compact instruments, designed to measure scattering only, draw a sample of aerosol and direct it across a collimated or focused light beam. The beam/aerosol intersection occurs inside an otherwise clean chamber and typically occupies a volume on the order of a cubic centimeter. Instruments delivering aerosol in this fashion include the Climet CI-261 Aerosol Nephelometer and the Sinclair-Phoenix Aerosol Photometer, both of which measure angularly integrated forward scattered light to indicate aerosol concentration, and NASA's polar nephelometer (Applied Optics 9 1113, 1970) in which a detector is scanned in a semi-circle to measure the angular dependence of light scattered from an illuminated column of sample aerosol.

The smallest quantity of aerosol is illuminated in optical particle counters, in which the light beam, aerosol stream, and detection optics are so tightly focused that, ideally, only one particle at a time produces a detectable light scattering signal. Often these instruments use a concentric pair of tubes as the inlet nozzle, an arrangement known as a sheath nozzle. Sample aerosol enters the scattering chamber through a narrow inner tube, while an outer tube, sometimes tapered, delivers a clean surrounding sheath flow that confines the sample particles to a narrow central core and directs them through a small but intense region of illumination.

The Royco 220 Particle Counter uses a laminar sheath flow to guide particles through a focused region of white light; light scattered from the particles into a lens at a right angle to the incident beam is detected. The Climet CI-208 Airborne Particle Analyzer also uses a sheath air nozzle, but operates at very high (turbulent jet) gas velocity rather than laminar flow. Aerosol particle/light interaction takes place at one focus of an elliptical mirror; nearly all the scattered energy can be collected by a detector at the other focus.

Full optical characterization of an aerosol cloud requires measurements of its extinction and its angular scattering properties, including polarization characteristics of the angularly scattered light. Current instruments do not combine the seemingly incompatible requirements of very long path lengths demanded for extinction measurements and the localization of illuminated sample needed for angular measurements and the efficient use of light gathering optics.

Transmissometers do not have angular scanning capability; such an instrument would be immense. The extinction of light in nephelometers, built for angular scanning, is too slight to be accurately measured. It is typically much smaller than the natural fluctuations of the light source itself. Single particle instruments, in addition to the extinction problem, are designed to analyze single particle characteristics and must process very low signal levels. The optical properties of a cloud as a whole could be obtained by summing thousands of individual particle measurements, but that is clearly an imprecise and inefficient procedure whenever only ensemble properties are desired.

Accordingly, it is an object of this invention to provide an improved nozzle for use with instruments designed to measure light scattering properties of aerosols.

More particularly, it is an object of this invention to provide a new nozzle which delivers a pulsating concentration of aerosol particles to a very small illuminated volume, thus enabling simultaneous measurements of extinction and scattering.

Other objects will appear hereinafter.

SUMMARY OF THE INVENTION

It has now been discovered that the above and other objects of the present invention may be accomplished in the following manner. Specifically, an improved aerosol nozzle device has been discovered.

The nozzle includes a body having a nozzle head chamber and includes a sample flow inlet and a sample flow outlet for transmitting aerosol through the nozzle head chamber. There is also provided an aerosol sample discharge means for discharging a small portion of the aerosol sample in a generally linear direction. At the same time, air supply means are provided to provide a clean, laminar air sheath surrounding the linearly discharged small sample. Pressure modulation means are included to modulate the discharged aerosol sample, in a way in which the modulation is confined to the nozzle head chamber.

The aerosol modulating nozzle of this invention delivers a small quantity of aerosol to a laser beam in a pulsating fashion that enables simultaneous measurement of both extinction and angular scattering with improved accuracy. The new nozzle is an improvement over the sheath flow nozzle used in single particle counters, because the concentration of aerosol particles delivered is much higher than that which would be suitable for a single particle instrument and the concentration pulsates. With the present invention, a representative ensemble of particles, rather than a single particle, is illuminated by an incident laser beam.

The total volume of sample aerosol illuminated by the present invention is very small, typically 0.01 cubic centimeters so efficient collection optics such as parabolic or elliptical reflectors can be employed. The disadvantages of a small sample volume, namely weak scattering signals generally and the near impossibility of measuring beam extinction, has been overcome by the nozzle's ability to modulate the quantity of sample passing through the laser beam at frequencies on the order of 10's to 100's of Hertz.

As a consequence of sample modulation the scattered light is similarly modulated, while light transmitted through the aerosol column suffers a small but periodic diminution with an amplitude proportional to the amount of extinction. The periodicity induced in the scattered and transmitted light makes its measurement amenable to lock-in detection techniques, affording much higher sensitivity than possible without sample modulation.

BRIEF DESCRIPTION OF THE DRAWINGS

For a more complete understanding of the invention, reference is hereby made to the drawings, in which.

DETAILED DESCRIPTION OF THE PREFERRED EMBODIMENT

Figure 1:
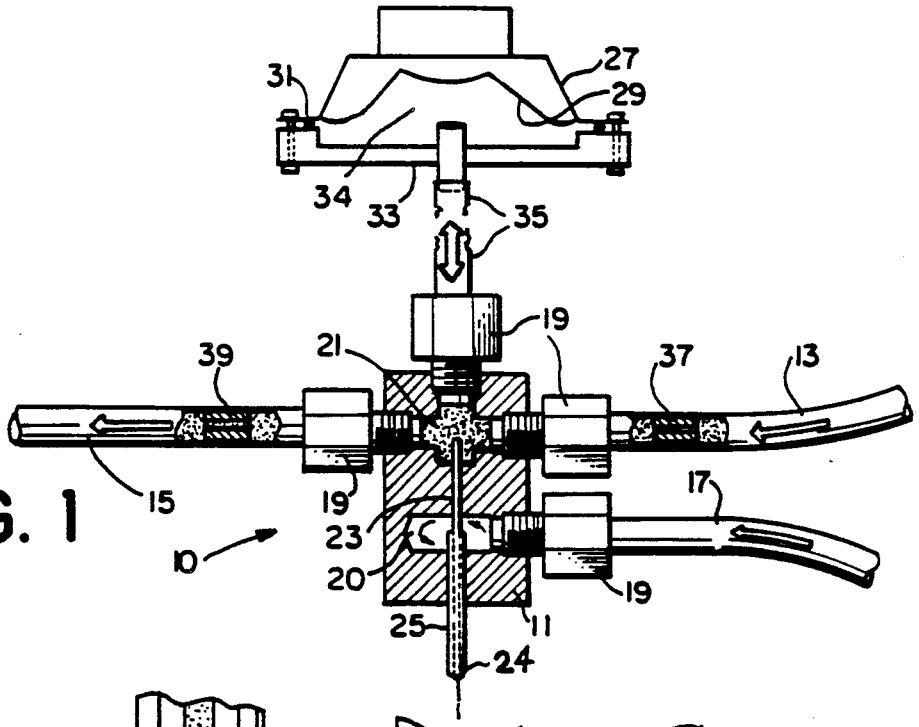
FIG. 1 is a side elevational view, partially in section, of the preferred embodiment of the invention.

As shown in the drawings, the nozzle of this invention, designated generally by reference numeral 10, includes a rectangular aluminum block which forms the nozzle body 11. Body 11 is drilled and tapped to accept tubes and tubing. In one embodiment, the body 11 is about 1 inch wide, 1.75 inches high and 1.5 inches deep.

Connected to body 11 is a sample inlet tubing 13, a sample outlet tubing 15, and a sheath flow tubing 17. Connection for each of these tubings is by a NPT connector 19, which, in this embodiment, connects quarter-inch tubing 13, 15 and 17 to body 11 via eighth-inch NPT tapped holes.

Inlet sample tubing 13 transports aerosol sample from its source, not shown, usually at atmospheric pressure, to the nozzle head region 21 in body 11. Sample outlet tubing 15 continues the aerosol sample flow out of the nozzle head 21 and toward an air pump, also not shown. Sample aerosol also enters sample injection tube 23, as this tube 23 serves as the conduit between the nozzle head region 21 and the nozzle outlet 24.

Sheath flow tubing 17 transports clean air to the sheath air chamber 20 in body 11. Air from tubing 17 enters air chamber 20 at the top of sheath flow tube 25. Tube 25 is concentric about tube 23 and provides a laminar sheath of clean air surrounding the sample flow, guiding the sample flow out of outlet 24. It is intended that this sample from outlet 24 and guided by air from sheath tube 25 will flow to a scattering chamber.

The nozzle 10 shown in FIG. 1 is based on the concentric sheath flow type of nozzle. The improvement is the apparatus which allows for sinusoidally modulating the quantity of core sample delivered by the nozzle into a laser beam. Sample modulation occurs as a result of pressure fluctuations at the nozzle head region 21 from loudspeaker 27. The electrical signal used to drive the loudspeaker also serves as the reference signal for lock-in amplifiers which are components of the light scattering detection system.

In this embodiment, a 4" diameter loudspeaker 27 includes a loudspeaker cone 29. This is the part of the loudspeaker 27 which moves back and forth, and it was made air tight with a thin layer of silicone glue for better operation. O-ring 31 forms an airtight seal between the loudspeaker cone 29 and the loudspeaker mounting plate 33. Plate 33 is a circular disk bolted to the front of loudspeaker 27 forming a small closed region 34. Region 34 has a volume and pressure which varies in proportion to loudspeaker cone 29 excursions. Pressure fluctuations are transmitted by pressure tube 35. The loudspeaker 27 is connected to nozzle body 11 by several feet of quarter-inch plastic tubing 35

The pressure fluctuations are generated by the connected loudspeaker 27 and confined to the head region 21 by an inlet construction 37 and an outlet construction 39 located in the tubings 13 and 15 respectively. These restrictions 37 and 39 continuously being sampled aerosol into and out of the head region 21. They provide a flow impedance which permits a pressure differential to be established between the nozzle head region 21 and the aerosol of the other or upstream side of constriction 37. In this embodiment, constriction 37 is a 0.8 inch long brass rod with a 0.035 diameter hole drilled through it.

Measurements made with the prototype indicate that pressure fluctuations relative to the average head pressure, of only about one part per thousand are sufficient to induce sample modulation. It is contemplated that this relatively large remotely connected loudspeaker 27 may be replaced with a much smaller speaker, perhaps with a 1 inch diameter. The smaller speaker would be affixed to the nozzle body 11 for firing directly into the head region.

It should also be noted that none of the dimensions, or materials, of the prototype nozzle are critical, but are merely shown to demonstrate the efficacy of the invention and demonstrate the concept of sample modulation.

The aerosol modulating nozzle is intended for use as one component of a complete integrated light scattering measurement apparatus, whose configuration would typically include a light scattering chamber with optical windows for admitting a laser beam and viewing scattered light. The nozzle discharges its sample aerosol out of end 24 of tube 23, with air from air sheath tube 25 surrounding it. An exhaust tube across the laser beam would remove the stream of sample aerosol, and a variety of pumps, valves, meters and other components would maintain pressure zones and gas flows throughout the system to keep the whole thing running.

The central injection tube 23 is the only conduit between the nozzle head region 21 and the scattering chamber interior. Thus, as shown in FIG. 2, aerosol sample is transported into the scattering chamber and through the laser beam according to whether the head pressure is higher than the chamber pressure. In steady state conditions, the sample flow through the injection tube 23 is directly proportional to the difference in pressure between head region 21 and the scattering chamber pressure.

The principle of operation of the modulating nozzle can be understood with reference to FIG. 2. The scattering chamber pressure and laminar sheath flow rate are first set by the operator to appropriate values and left fixed. The nozzle head pressure is then varied by adjusting the sample flow rate drawn through the sample inlet and outlet tubes. In all cases the flow of sample leaving the head through the injection tube 23 is a small fraction of the sample transported through the head region by the inlet/outlet tubings 13 and 15 respectively.

Figure 2A:
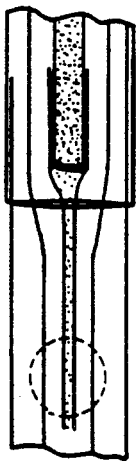
FIG. 2 is a schematic view of three alternative variations in the use of the present invention, labeled FIG. 2A 2B, and 2C respectively, in conjunction with a light scattering chamber, to illustrate the principles of operation of this invention.

With the head/chamber differential pressure is just slightly positive, a thin filament of sample is drawn by the sheath flow through the laser beam, represented by a dashed circle in FIG. 2*a*. As the pressure increases, the core of sample flow surrounded by sheath flow increases in diameter, as in FIG. 2*b*.

When the pressure is increased further, so that the sample flow velocity in the injection tube 23 matches the surrounding sheath flow velocity, there is little distortion of the sample flow as it exits and the diameter of the sample core flow through the laser is about the same as the injection tube 23 inside diameter. Further increases in pressure does not widen the core diameter appreciably, at least not until the pressure differential becomes very great. Instead, the core punches through with a velocity that increases with increasing pressure differential.

Although the rate at which sample is injected into the laser beam is always directly proportional to the pressure differential between the head and chamber, the intensity of light scattered (and degree of beam extinction) are not so simply related to this differential pressure. They are proportional to the number of particles illuminated.

Throughout the nozzle 10, there is no turbulent mixing of aerosol with clean air, so the number density of sample particles does not vary significantly anywhere. Specifically, the number density of particles in the core flow is essentially the same as in the original sampled cloud, regardless of nozzle operating conditions. It is only the diameter of the core flow which depends on the pressure differential, and not always linearly. For very small positive values of this pressure difference, the sheath flow is only slightly perturbed by the injected core flow, which quickly takes on the sheath flow velocity. In that case is can be shown that the scattered light intensity should be directly proportional to the head/chamber differential pressure.

Figure 2B:
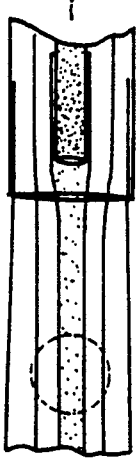
Figure 2C:
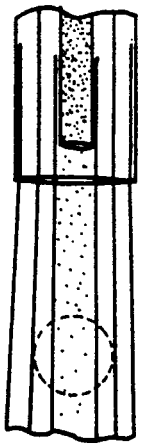

At the other extreme, of relatively large pressure differences, the core diameter does not increase and so neither does the scattering intensity. It reaches a maximum value and remains fixed as further increases increase the velocity but not the number of particles within the laser beam at any instant. Moderate values such as shown in FIG. 2*b* span a transition region between linear dependence and saturation of the light scattering signal. The curve shown in FIG. 3 is taken from actual data measured with the prototype nozzle and clearly shows the scattered light intensity to vary with head pressure in the manner just described.

The sequence of steps for operating the modulating nozzle to inject sample aerosol into a scattering chamber light beam is as follows. First, with the loudspeaker 27 turned off, flow controls on the overall system are adjusted as they would be in setting up a sheath nozzle for single particle work. The scattering chamber is set to the desired pressure (usually a small amount below atmospheric pressure), a laminar sheath flow is obtained, and sample flow rates are adjusted so that a fine stream of aerosol, enveloped by the sheath air, is transported through the laser beam. At least one light detector is monitored to observe the intensely of scattered light.

Next the head pressure, measured, as always, relative to the chamber pressure, may be varied by adjusting the sample flow rate through the head region. It will be observed that sample flow through the laser beam, and hence detected scattered light, cases whenever head pressure drops below chamber pressure. As the head pressure is increased above chamber pressure the light scattering signal grows, quickly at first and then more slowly, approaching a maximum value. The mean head pressure (corresponding to point M in FIG. 3) should be set to about half the value at which the light scattering signal becomes nearly saturated.

Figure 3:
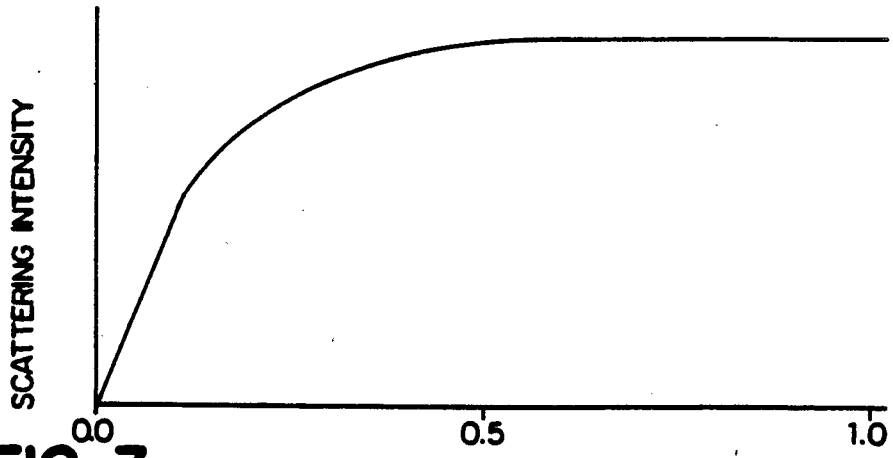
FIG. 3 is a graphical representation of the relationship between pressure and scattering intensity.

The loudspeaker 27 should now be driven with a low frequency (about one Hertz) sine wave with its amplitude regulated so that the head pressure oscillates between 0 and 2M, as indicated by the arrows in FIG. 3. The core flow of sample aerosol, and the light scattered from it, will now be oscillating at the same frequency and with a degree of modulation of nearly 100%. The degree of modulation measures the amplitude of the swing of the instantaneous scattering signal around its average value during the modulation cycle. It is defined to be $(I\ max - I\ min)/(I\ max + I\ min) \times 100\%$, where I max and I min are the maximum and minimum values the signal attains as it oscillates.

Finally the modulation frequency can and should be increased from its low starting value, but it will be observed that after some critical frequency is exceeded, the degree of modulation will fall off as the frequency is increased further. This is because the inertia of the air mass in the injector tube limits the speed with which its flow can respond to changes in the head/chamber differential pressure. The trade off between modulation frequency and degree of modulation depends on the injection tube length and diameter.

Various embodiments and features of the present invention have been shown in the foregoing. Other embodiments will also be seen without departing from the scope and spirit of the invention.

Having thus described the invention, what is claimed is:

1. An aerosol modulating nozzle device, comprising:

(a) a nozzle body having a nozzle head chamber and including aerosol sample flow inlet and outlet means for transmitting aerosol sample through said nozzle head chamber;

(b) sample discharge means for discharging a small portion of said aerosol in a predetermined direction;

(c) air supply means for providing a sheath of clean air surrounding said small portion of said aerosol; and (d) modulating means for modulating said discharged aerosol sample.

2. The device of claim 1, wherein said modulating means includes means for confining said modulating to said nozzle chamber.

3. The device of claim 2, wherein said means for confining said modulating comprises constriction means in said sample flow inlet and outlet means to provide a pressure difference across said constriction means.

4. The device of claim 1, wherein said modulating means includes a loudspeaker means having a closed chamber having a volume and pressure proportional to loudspeaker excursions to generate pressure fluctuations, and said chamber includes means for transmitting said pressure fluctuations to said nozzle head chamber and said modulating means.

5. An aerosol modulating nozzle device, comprising:

(a) a nozzle body having a nozzle head chamber and including aerosol sample flow inlet and outlet means for transmitting aerosol sample through said nozzle head chamber;

(b) sample discharge means for discharging a small portion of said aerosol in a predetermined direction;

(c) air supply means for providing a sheath of clean air surrounding said small portion of said aerosol; and (d) modulating means for modulating said discharged aerosol sample, said modulating means including means for confining said modulating to said nozzle chamber and a loudspeaker means having a closed chamber having a volume and pressure proportional to loudspeaker excursions to generate pressure fluctuations, and said chamber includes means for transmitting said pressure fluctuations to said nozzle head chamber and said modulating means.

6. The device of claim 5, wherein said means for confining said modulating comprises constriction means in said sample flow inlet and outlet means to provide a pressure difference across said constriction means.

7. In combination, a laser beam in a scattering chamber and an aerosol modulating nozzle device, comprising:

(a) a nozzle body having a nozzle head chamber and including aerosol sample flow inlet and outlet means for transmitting aerosol sample through said nozzle head chamber;

(b) sample discharge means for discharging a small portion of said aerosol in a predetermined direction;

(c) air supply means for providing a sheath of clean air surrounding said small portion of said aerosol; and (d) modulating means for modulating said discharged aerosol sample.

8. The device of claim 7, wherein said modulating means includes means for confining said modulating to said nozzle chamber.

9. The device of claim 8, wherein said means for confining said modulating comprises constriction means in said sample flow inlet and outlet means to provide a pressure difference across said constriction means.

10. The device of claim 7, wherein said modulating means includes a loudspeaker means having a closed chamber having a volume and pressure proportional to loudspeaker excursions to generate pressure fluctuations, and said chamber includes means for transmitting said pressure fluctuations to said nozzle head chamber and said modulating means.

* * * * *